United States Patent
Yamauchi et al.

(10) Patent No.: US 10,797,485 B2
(45) Date of Patent: Oct. 6, 2020

(54) POWER CONDITIONER, POWER SUPPLY SYSTEM, AND CURRENT CONTROL METHOD

(71) Applicant: TABUCHI ELECTRIC CO., LTD., Osaka-shi, Osaka (JP)

(72) Inventors: Yuji Yamauchi, Osaka (JP); Hiroshi Asano, Osaka (JP); Masataka Shintani, Osaka (JP); Hirofumi Konishi, Osaka (JP)

(73) Assignee: TABUCHI ELECTRIC CO., LTD., Osaka-shi, Osaka (JP)

( * ) Notice: Subject to any disclaimer, the term of this patent is extended or adjusted under 35 U.S.C. 154(b) by 141 days.

(21) Appl. No.: 16/088,964

(22) PCT Filed: Mar. 10, 2017

(86) PCT No.: PCT/JP2017/009761
§ 371 (c)(1),
(2) Date: Sep. 27, 2018

(87) PCT Pub. No.: WO2017/169665
PCT Pub. Date: Oct. 5, 2017

(65) Prior Publication Data
US 2019/0109458 A1 Apr. 11, 2019

(30) Foreign Application Priority Data
Mar. 29, 2016 (JP) .................. 2016-065449

(51) Int. Cl.
*H02J 3/32* (2006.01)
*H02M 1/32* (2007.01)
(Continued)

(52) U.S. Cl.
CPC ............. *H02J 3/32* (2013.01); *H02J 3/383* (2013.01); *H02J 7/35* (2013.01); *H02J 9/06* (2013.01);
(Continued)

(58) Field of Classification Search
CPC ...... H02J 3/32; H02J 3/383; H02J 7/35; H02J 9/06; H02M 1/10; H02M 1/126;
(Continued)

(56) References Cited

U.S. PATENT DOCUMENTS

| 5,875,414 A | 2/1999 | Tsutsumi | |
|---|---|---|---|
| 2007/0045286 A1* | 3/2007 | Mizuno | H02M 7/4807 219/501 |

(Continued)

FOREIGN PATENT DOCUMENTS

| JP | H09-233832 A | 9/1997 |
|---|---|---|
| JP | 5596934 B2 | 9/2014 |

(Continued)

OTHER PUBLICATIONS

International Preliminary Report on Patentability and Written Opinion issued in PCT/JP2017/009761; dated Oct. 2, 2018.
(Continued)

*Primary Examiner* — Rexford N Barnie
*Assistant Examiner* — Kalu Kelly Emeaba
(74) *Attorney, Agent, or Firm* — Studebaker & Brackett PC

(57) ABSTRACT

In a conventional power supply system, it was difficult to quickly activate a motor load or the like after performing switching to an isolated operation. A power conditioner of the present invention comprises: a DC-DC converter part for converting a direct-current power from a direct-current power source into a given voltage; an inverter part for converting a direct-current power from the DC-DC con-
(Continued)

verter part into an alternating-current power; a switch disposed between an alternating-current power output end of the inverter part and a utility power source; and a control part for controlling an output current of the alternating-current power from the inverter part, wherein, in response to opening the switch to cause switching to the isolated operation, the control part is operable, when a given condition is not satisfied, to control the output current such that the output current does not exceed a first upper limit preliminarily determined based on a rated output current value of the power conditioner, and, when the given condition is satisfied, to control the output current such that the output current does not exceed a second upper limit greater than the first upper limit.

4 Claims, 3 Drawing Sheets

(51) Int. Cl.

| | | |
|---|---|---|
| *H02M 7/5395* | (2006.01) | |
| *H02J 9/06* | (2006.01) | |
| *H02J 7/35* | (2006.01) | |
| *H02M 7/48* | (2007.01) | |
| *H02M 7/5387* | (2007.01) | |
| *H02M 1/10* | (2006.01) | |
| *H02J 3/38* | (2006.01) | |
| *H02M 1/12* | (2006.01) | |
| *H02M 1/00* | (2006.01) | |

(52) U.S. Cl.
CPC ............. *H02M 1/10* (2013.01); *H02M 1/126* (2013.01); *H02M 1/32* (2013.01); *H02M 7/48* (2013.01); *H02M 7/5387* (2013.01); *H02M 7/5395* (2013.01); *H02M 7/53871* (2013.01); *H02M 2001/0019* (2013.01); *Y02E 70/30* (2013.01)

(58) Field of Classification Search
CPC ........ H02M 1/32; H02M 7/48; H02M 7/5387; H02M 7/53871; H02M 7/5395; H02M 2001/0019; Y02E 70/30
See application file for complete search history.

(56) References Cited

U.S. PATENT DOCUMENTS

| | | | |
|---|---|---|---|
| 2010/0156185 A1* | 6/2010 | Kim ................... | H01M 16/003 307/72 |
| 2016/0204691 A1 | 7/2016 | Okuda et al. | |

FOREIGN PATENT DOCUMENTS

| | | |
|---|---|---|
| JP | 2015-035847 A | 2/2015 |
| JP | 2015-231259 A | 12/2015 |
| WO | 2015/029597 A1 | 3/2015 |

OTHER PUBLICATIONS

International Search Report issued in PCT/JP2017/009761; dated Apr. 11, 2017.

* cited by examiner

POWER CONDITIONER, POWER SUPPLY SYSTEM, AND CURRENT CONTROL METHOD

TECHNICAL FIELD

The present invention relates to a power supply system, and a power conditioner and a current control method for use in the power supply system.

BACKGROUND ART

Conventionally, a power supply system (distributed power source system) using a solar battery, a fuel battery or the like as a power generating source is equipped with a power conditioner for performing conversion into an alternating-current power having a frequency and a voltage compatible with a utility grid (commercial power system), so as to allow the power supply system to be used while being connected to the utility grid.

The power conditioner comprises a DC-DC converter for adjusting a voltage of a direct-current power output from the power generating source, to a give direct-current voltage value, a DC-AC inverter for converting a direct-current power output from the DC-DC converter into an alternating-current power, and a filter circuit, such as an LC filter, for removing a high frequency component from an output of the DC-AC inverter.

Further, the power supply system is configured to be switchable between a grid-connected operation in which the power supply system is operated while being connected to a utility grid, and an isolated operation in which the power supply system is operated while being isolated from the utility grid, by means of a protection relay provided in the power conditioner (Patent Document 1).

Specifically, the power supply system is configured, when a grounding fault or a short-circuiting fault occurs in a distribution line as a utility grid to which the power supply system is connected, or when power supply from the distribution line is stopped for some reason, to be switched to the isolated operation to prevent influence on operation of a section switch and ensure safety of work on the distribution line.

After the switching, power feeding to a load is performed by the alternating-current power output from the DC-AC inverter. Here, in a commonly-used power supply system, switching is not performed without instantaneous interruption, so that, just after the switching, overcurrent is highly likely to occur due to charging to a capacitor of a load-side electronic device, etc. Therefore, in order to prevent a situation where components inside the power conditioner are damaged by the overcurrent, the power conditioner typically has a circuit for preventing overcurrent or a control part for suppressing an inrush current (Patent Documents 2, 3).

CITATION LIST

Patent Document

Patent Document 1: JP 5596934B
Patent Document 2: JP 2015-035847A
Patent Document 3: JP 2015-231259A

SUMMARY OF INVENTION

Technical Problem

In the above conventional power supply system, the power conditioner is incapable of, when activating a load after performing switching to the isolated operation, supplying a current to the load beyond a rated output current. However, it is often the case that a current several times the rated output current is needed to activate a load such as a motor load or a compressor load. Therefore, there is a problem that it is difficult to quickly activate the load in such a situation.

Solution to Technical Problem

The above problem is solved by the present invention having the following feature. According to a first aspect of the present invention, there is provided a power conditioner connected to a direct-current power source, a utility power source, and a load. The power conditioner comprises: a DC-DC converter part for converting a direct-current power from the direct-current power source into a given voltage; an inverter part for converting a direct-current power from the DC-DC converter part into an alternating-current power; a switch disposed between an alternating-current power output end of the inverter part and the utility power source; and a control part for controlling an output current of the alternating-current power from the inverter part, wherein, in response to opening the switch to cause switching to an isolated operation in which the power supply system is operated to supply power to the load, while being isolated from the utility power source, the control part is operable, when a given condition is not satisfied, to control the output current such that the output current does not exceed a first upper limit preliminarily determined based on a rated output current value of the power conditioner, and, when the given condition is satisfied, to control the output current such that the output current does not exceed a second upper limit greater than the first upper limit.

In one specific embodiment of the first aspect of the present invention, the given condition includes a condition that an elapsed time period after the switching to the isolated operation falls within a predetermined time period.

In the above embodiment, the predetermined time period may be determined based on electric energy of the alternating-current power output from the inverter part.

In the above embodiment, the given condition may include a plurality of conditions each corresponding to the predetermined time period, wherein the second upper limit may be set with respect to each of the plurality of conditions.

In another embodiment of the first aspect of the present invention, the power conditioner comprises a temperature sensor installed inside the inverter part, wherein the control part is configured to detect temperature by the temperature sensor, and wherein the given condition includes a condition that the detected temperature is equal to or less than a given temperature.

According to a second aspect of the present invention, there is provided a power supply system comprising the above power conditioner and the above direct-current power source.

According to a third aspect of the present invention, there is provided a current control method for use with a power supply system comprising a direct-current power source, and a power conditioner connected to the direct-current power source, a utility power source, and a load. The current control method comprises the steps of: switching from a grid-connected operation in which the power supply system is operated while being connected to the utility power source, to an isolated operation in which the power supply system is operated to supply power to the load, while being isolated from the utility power source; and outputting an alternating-current power from the power conditioner, based on a direct-current power supplied from the direct-current power source, wherein the step of outputting an alternating-current power includes the sub-steps of: when a given condition is satisfied, controlling an output current of the alternating-current power such that a current value of the output current does not exceed a given current value greater than a rated output current value of the power conditioner; and, when the given condition is not satisfied, to control the output current such that the current valve of the output current does not exceed the rated output current value.

Effect of Invention

In the present invention, when power is supplied to a load, such as a motor load or a compressor load, after performing switching to the isolated operation, the output current is controlled such that it is permitted to exceed the rated output current value of the power conditioner under a certain condition that components inside the power conditioner are not damaged, so that it becomes possible to activate the load more quickly than ever before.

DESCRIPTION OF EMBODIMENTS

[Outline]

With reference to the drawings, a power supply system of the present invention will now be described based on one embodiment thereof. The following description will be made first about a system configuration and second about control of an output current value.

[System Configuration]

Figure 1:
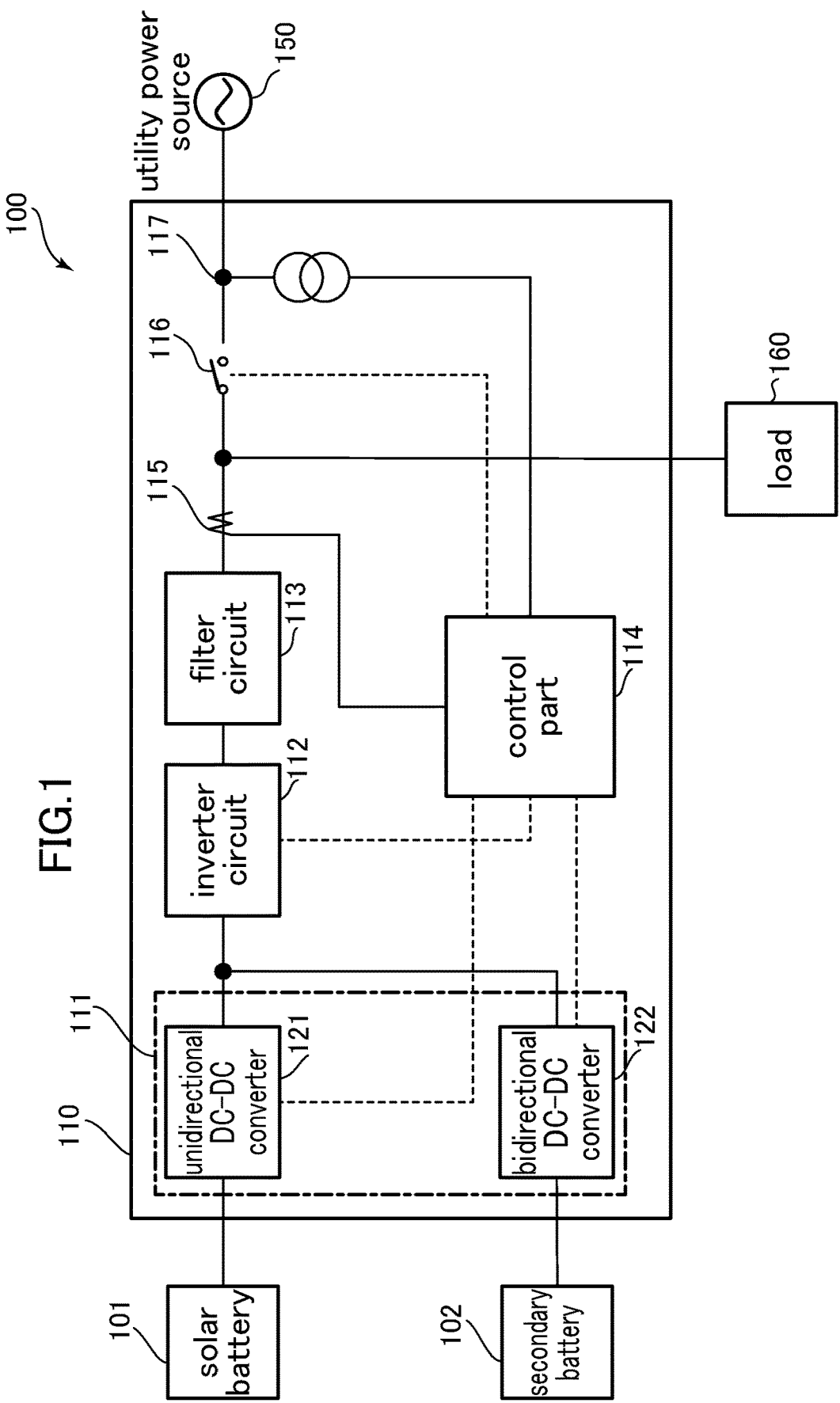
FIG. 1 is a block diagram depicting a power supply system according to one embodiment of the present invention.

FIG. 1 depicts a power supply system according to one embodiment of the present invention. The power supply system 100 comprises a solar battery 101, an electric accumulator 102, and a power conditioner 110 to which the solar battery 101 and the electric accumulator 102 are connected. The power supply system 100 depicted in FIG. 1 is also called "distributed power source", and connected to a utility power source (commercial power source) 150 and a load 160. For example, the utility power source 150 is a utility grid in which power is delivered from an electric power supplier or the like via distribution lines, and the load 160 is an isolated load to which power is to be supplied during an aftermentioned isolated operation.

The solar battery 101 preferably comprises a plurality of photovoltaic arrays each formed by connecting a plurality of strings in parallel, and a junction box housing a backflow prevention element, a surge absorber, a switch and others (not depicted) is connected in series between the solar battery 101 and the power conditioner 110. The solar battery 101 may be a power generating source using a direct-current powder obtained by rectifying an alternating-current output of a power generator or a wind power generator, or a direct-current powder generated by a fuel battery or the like.

As the electric accumulator 102, it is possible to use, e.g., a secondary battery, or another direct-current power storage device such as an electric double layer capacitor or a superconducting magnetic energy storage device. Although the power conditioner 110 in this embodiment comprises an electric accumulator, it may have a configuration devoid of an electric accumulator. It is noted here that, in this specification, the term "direct-current power source" is used as a general term encompassing the solar battery 101 and the electric accumulator 102.

The power conditioner 110 comprises a DC-DC converter 111, an inverter circuit 112, a filter circuit 113, and a control part 114.

The DC-DC converter 111 comprises a unidirectional DC-DC converter 121 connected to the solar battery 101 and configured to control the amount of power generation of the solar battery 101, and a bidirectional DC-DC converter 122 connected to the electric accumulator 102 and configured to control charging and discharging of the electric accumulator 102. For the sake of simplifying the description, each of these converters will be described on the assumption that it is provided by a number of one. However, for example, the unidirectional DC-DC converter 121 may be provided correspondingly with respect to each of the plurality of photovoltaic arrays.

The unidirectional DC-DC converter 121 is operable to raise (or lower) a voltage of a direct-current power supplied from the solar battery 101, to a given direct-current link voltage. The bidirectional DC-DC converter 122 is operable, during a discharging mode, to raise (or lower) a voltage of a direct-current power stored in the electric accumulator 102, and, during a charging mode, to lower (or raise) a voltage of a direct-current power generated, e.g., by the solar battery 101, to a value suited to charging the electric accumulator 102. An output from at least one of the unidirectional DC-DC converter 121 and the bidirectional DC-DC converter 122 is input into the inverter circuit 112 via a power line.

The inverter circuit 112 is operable to convert the direct-current power input thereinto to an alternating-current power having, e.g., a voltage of single-phase 200 V and a frequency of 60 Hz as a utility power frequency, and output the alternating-current power to at least one of the utility power source 150 and the load 160 via a power line.

The filter circuit 113 is connected to the inverter circuit 112, and operable to eliminate harmonics and noise from the alternating-current power output from the inverter circuit 112, and prevent disturbance due to environmental factors from the side of the utility power source.

The power line of the alternating-current power passing through the filter circuit 113 is connected to the utility power source 150 via a grid-connecting switch (grid disconnecting (parallel-off) relay) 116. Further, the power conditioner 110 is connected to the load 160 such that power can be supplied to the load 160.

The control part 114 is provided as a means to control operations of the DC-DC converter 111 and the inverter circuit 112, and perform opening-closing control of the grid-connecting switch 116. For example, these controls are realized by arithmetic processing of a microcomputer or a digital signal processor (DSP) provided in the power conditioner 110.

The control part 114 is operable to control a voltage of an output of the unidirectional DC-DC converter 121 by issuing an on/off instruction for a gate of a switch element of the unidirectional DC-DC converter 121 to open/close the switch element, and perform charging/discharging control by issuing an on/off instruction for a gate of a switch element of the bidirectional DC-DC converter 122. Examples of the switch elements include a MOSFET and an IGBT.

Further, the control part 114 is operable to control an output current of the inverter circuit 112 by issuing an on/off instruction for a gate of a switch element of the inverter circuit 112. The control part 114 is configured to acquire an inverter output current value by a current sensor (e.g., CT (Current Transformer)) 115 at a position just after passing through the filter circuit 113.

Figure 2A:
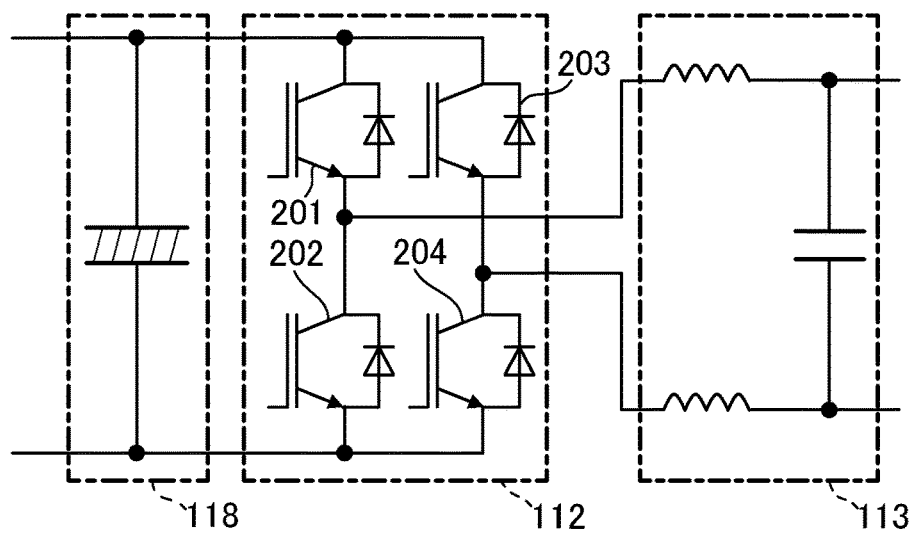
FIG. 2a is a circuit diagram depicting one example of an inverter circuit and surrounding circuits in this embodiment.
Figure 2B:
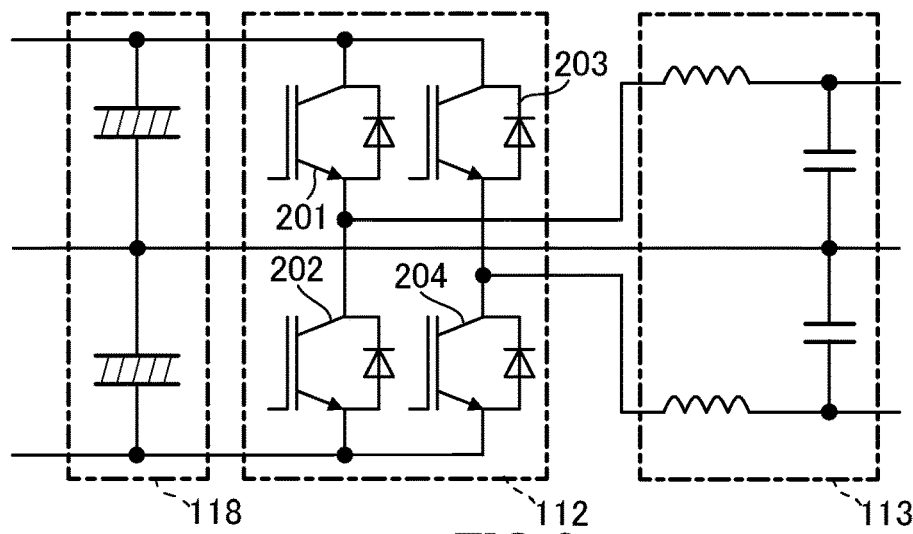
FIG. 2b is a circuit diagram depicting another example of the inverter circuit and the surrounding circuits in this embodiment.
Figure 2C:
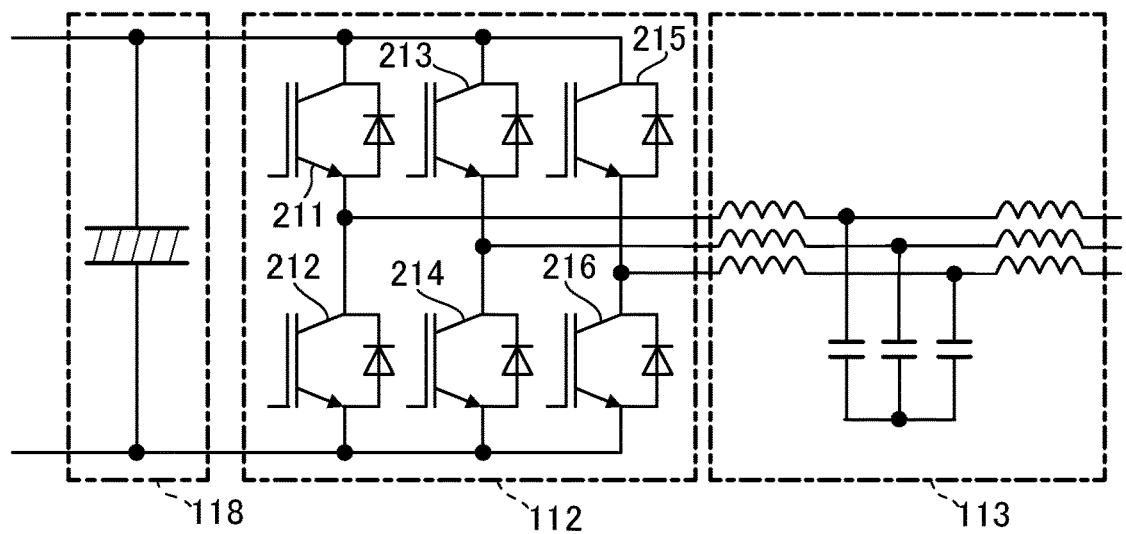
FIG. 2c is a circuit diagram depicting yet another example of the inverter circuit and the surrounding circuits in this embodiment.

FIGS. 2a to 2c are circuit diagrams depicting examples of the inverter circuit 112 and surrounding circuits in this embodiment. Input to the inverter circuit 112 is performed by input to a direct-current link circuit 118 from the DC-DC converter 111, and output from the inverter circuit 112 is performed by output of an alternating-current power to the side of the filter circuit 113. In case of a single-phase inverter, it can be formed as a full-bridge circuit consisting of four switch elements 201 to 204, as depicted in FIG. 2a, or as a circuit consisting of four switch elements 201 to 204 and composed of a combination of two half-bridges, as depicted in FIG. 2b. The example of FIG. 2a is designed to conform to a single-phase three-wire system which is a commonly-used domestic power source, and is part of a configuration in which a plus terminal of the solar battery 101 and a neutral point of the utility power source 150 have the same potential.

As one example of current control, the output current value can be adjusted by controlling turn-on and turn-off of each of the four switch elements through PWM control using a reference sine wave and a modulation wave. For example, the output current value can be adjusted by performing the control such that the acquired inverter output current value is fed back and compared with the reference sign wave, and a resulting difference therebetween is amplified and compared with the modulation wave.

As another example of the current control, the output current value can be adjusted by instantaneous current control which is used in a residential single-phase inverter in some cases. For example, the output current is controlled by: generating a control target value of the inverter output current while setting an upper limit and a lower limit of the control target value; when the acquired inverter output current reaches the upper limit, turning on the switch elements 201, 204 and turning off the switch elements 202, 203; and, when the acquired inverter output current reaches the lower limit, turning off the switch elements 201, 204 and turning on the switch elements 202, 203.

In case of a a three-phase inverter, it is composed of six switch elements 211 to 216, as depicted in FIG. 2c. As one example of the current control, the output current value can be adjusted, specifically, by controlling turn-on and turn-off of each of the six switch elements through PWM control using a modulation wave and a carrier wave corresponding to each of a-phase, b-phase and c-phase inverter output voltages.

The opening-closing control of the grid-connecting switch can be realized by an interconnection protection function typically provided in the power conditioner. Various types of relays for the interconnection protection function are configured to be operated based on a current value or a voltage value acquired by the current sensor 115, a voltage sensor (e.g., VT (Voltage Transformer)) 117 or the like.

The power conditioner 110 is operable, during grid-connection, to close the grid-connecting switch 116 to enable a grid-connected operation. When an islanding operation state is detected by the interconnection protection function, a relay for preventing the islanding operation is typically used to open the grid-connecting switch so as to perform the isolated operation. Here, the grid-connected operation means a mode in which the power supply system 100 is operated while being connected to a utility power source, and the isolated operation means a mode in which the power supply system 100 is operated to supply power from the direct-current power source to the load 160, while being disconnected (subjected to parallel-off). It should be understood that, although the power conditioner 110 in this embodiment may have an interconnection protection function and a relay (switch) provided in a commonly-used power conditioner, part of them is omitted for the sake of simplifying the description.

Further, it is noted that the control part 114 is capable of performing an electrical disconnection at the unidirectional DC-DC converter 121 and/or the bidirectional DC-DC converter 122 as an input part of the DC-DC converter 122 from the direct-current power source.

[Control of Output Current Value]

Through the aforementioned PWM control or the like, the inverter output current value is controlled to come close to a target current value based on a demand from a load as a supply destination. Here, in order to prevent damage to components inside the power conditioner due to overcurrent, the control part 114 is operable to generate the target current value of the inverter output current such that the inverter output current does not exceed a rated output current value of the power conditioner 110. The rated output current value of the power conditioner means an upper-limit (maximum) output current value of the power conditioner in a range capable of, in a steady state in which the power conditioner continues to output a constant current, ensuring to prevent components inside the power conditioner from being damaged by heat due to the current. Thus, the control part 114 is operable, in the steady state, to set an upper limit of the inverter output current to a given value (first value) based on the rated output current value of the power conditioner 110. As long as the inverter output current value is equal to or less than the first value, an output current value of the power conditioner 110 becomes equal to or less than the rated output current value. It is noted here that the first value is the same as the rated output current value in some cases.

However, as mentioned above, in a commonly-used power supply system, switching to the isolated operation is not performed without instantaneous interruption, so that, a current value required by a load just after the switching is highly likely to become large. This is due to charging to a capacitor of a load-side electronic device, etc. Thus, it has been difficult to quickly activate the load such as a motor load or a compressor load.

The present invention is intended to, just after switching to the isolated operation, control the inverter output current to flow beyond the rated output current value of the power conditioner while controlling the upper limit of the inverter output current to prevent damage to components inside the power conditioner, thereby realizing, e.g., activation of the load within a period of time shorter than ever before.

Figure 3:
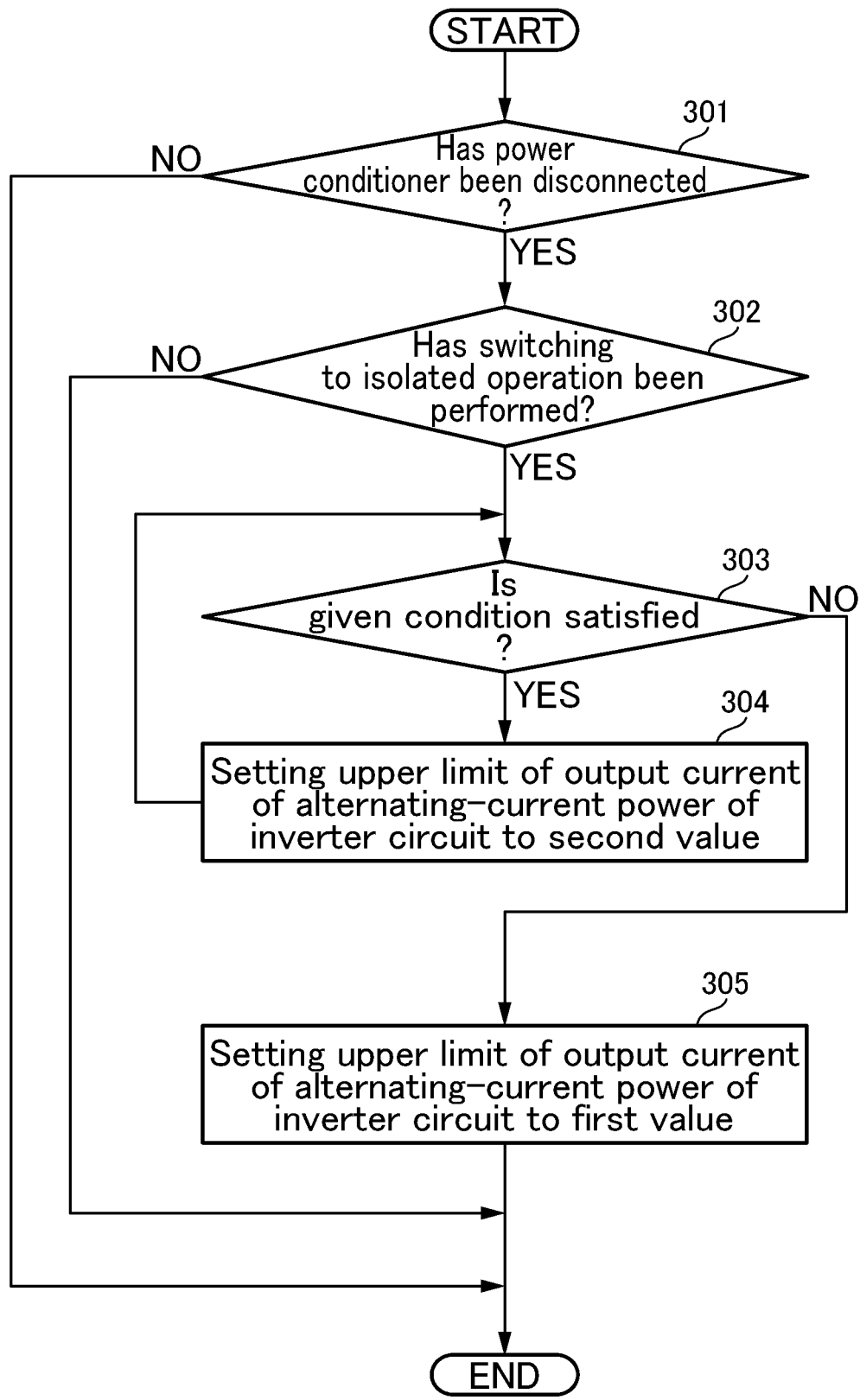
FIG. 3 is a flowchart indicating processing to be executed when a control part in this embodiment generates an upper limit of a target current value of an output current.

FIG. 3 is a flowchart indicating processing to be executed when the control part in this embodiment generates the upper limit of the target current value of the inverter output current. A processing routine of this flowchart may be started at given time intervals, or may be started or triggered by the fact that the grid-connecting switch 116 is opened by the interconnection protection function. Further, this flowchart may be executed in the form of being incorporated in part of a main control routine of the power conditioner 110, or may be executed by calling the processing routine of the flow chart in response to opening of the grid-connecting switch 116.

In step 301, it is determined whether the power conditioner 110 has been disconnected. When the power conditioner 110 has not been disconnected, the processing routine of this flowchart is ended. On the other hand, when the power conditioner 110 has been disconnected, it is determined, in step 302, whether switching to the isolated operation has been performed. When the switching to the isolated operation has not been performed, the processing routine of this flowchart is ended. On the other hand, when the switching has been performed, the processing routine proceeds to step 303. At this point, the power conditioner 110 starts to supply an alternating-current power from the inverter circuit 112 to the load 160. In the step 303, it is determined whether a given condition is satisfied.

When the given condition is satisfied in the step 303, the upper limit of the inverter output current is set to a given value (second value) greater than the first value, in step 304. For example, the second value may be 1.5 times greater than the first value, or may be 2 times greater than the first value.

As one example, the given condition may include a condition that an elapsed time period after the switching to the isolated operation falls within a predetermined time period. For example, when the predetermined time period is set to 100 ms, the given condition is satisfied as long as the elapsed time period after the switching to the isolated operation falls within 100 ms.

Further, each of the given condition and the second value may be set in a stepwise manner. Specifically, the given condition may include a plurality of conditions each corresponding to the predetermined time period, and the second value is set with respect to each of the plurality of conditions. For example, when the elapsed time period after the switching is less than 100 ms, the second value is set to be 2 times greater than the first value. Further, when the elapsed time period after the switching is less than 10 sec (and equal to or greater than 100 ms), the second value is set to be 1.8 times greater than the first value, and, when the elapsed time period after the switching is less than 1 min (and equal to or greater than 10 sec), the second value is set to be 1.5 times greater than the first value. Alternatively, the predetermined time period may be determined based on electric energy of the inverter output current.

In another example, the the given condition may include a condition that a temperature detected by a temperature sensor installed inside the powder conditioner 110 is equal to or less than a given temperature. In this case, the power conditioner 110 may comprise a sensor for detecting a temperature of a specific component, such as an intelligent power module (IPM), inside the inverter circuit 112 thereof, and the control part 114 is operable to determine whether the detected temperature is equal to or less than a given temperature.

Returning to the flowchart again, when the given condition is not satisfied in the step 303, the upper limit of the inverter output current is set to the first value, in step 305, and the processing routine of this flowchart is ended.

In the processing or operation described above, it is possible to freely change the processing or operation, unless there arises inconsistency in processing or operation, e.g., a situation where, in a certain step, data which should not be yet able to be used is used. Further, although the above embodiment has been described by way of examples for explaining the present invention, the present invention is not limited to the embodiment. The present invention can be implemented in various forms without departing from the scope and spirit of the present invention.

LIST OF REFERENCE SIGNS

100: power supply system
101: solar battery
102: electric accumulator
111: DC-DC converter
112: inverter circuit
113: filter circuit
114: control part
115: current sensor
116: grid-connecting switch (grid-disconnecting relay)
117: voltage sensor
118: direct-current link circuit
121: unidirectional DC-DC converter
122: bidirectional DC-DC converter
150: utility power source
160: load
201 to 204, 211 to 216: switch element

The invention claimed is:

1. A power conditioner in a power supply system comprising a direct-current power source and the power conditioner connected to a direct-current power source, a utility power source, and a load, the power conditioner comprising:
    a DC-DC converter part for converting a direct-current power from the direct-current power source into a given voltage;
    an inverter part for converting a direct-current power from the DC-DC converter part into an alternating-current power;
    a switch disposed between an alternating-current power output end of the inverter part and the utility power source; and
    a control part for controlling an output current of the alternating-current power from the inverter part,
    wherein, in response to opening the switch to cause switching to an isolated operation in which the power supply system is operated to supply power to the load, while being isolated from the utility power source,
        the control part is operable, when a first given condition and a second given condition are not satisfied, to control the output current such that the output current does not exceed a first upper limit preliminarily determined based on a rated output current value of the power conditioner, wherein the first given condition is that an elapsed time after the switching to the isolated operation is within a first predetermined time period and the second given condition is that an elapsed time after the switching is greater than the first predetermined time period and within a second predetermined time period,
        the control part is operable, when the first given condition is satisfied, to control the output current such that the output current does not exceed a second upper limit greater than the first upper limit, and
        the control part is operable, when the second given condition is satisfied, to control the output current such that the output current does not exceed a third upper limit which is greater than the first upper limit and smaller than the second upper limit.

2. The power conditioner according to claim 1, wherein the first predetermined time period and the second predetermined time period are determined based on electric energy of the alternating-current power output from the inverter part.

3. A power supply system comprising a direct-current power source, and a power conditioner connected to the direct-current power source, a utility power source, and a load, wherein the power conditioner comprises:

a DC-DC converter part for converting a direct-current power from the direct-current power source into a given voltage;

an inverter part for converting a direct-current power from the DC-DC converter part into an alternating-current power;

a switch disposed between an alternating-current power output end of the inverter part and the utility power source; and a control part for controlling an output current of the alternating-current power from the inverter part, wherein, in response to opening the switch to cause switching to an isolated operation in which the power supply system is operated to supply power to the load, while being isolated from the utility power source, the control part is operable, when a first given condition and a second given condition are not satisfied, to control the output current such that the output current does not exceed a first upper limit preliminarily determined based on a rated output current value of the power conditioner, wherein the first given condition is that an elapsed time after the switching to the isolated operation is within a first predetermined time period and the second given condition is that an elapsed time after the switching is greater than the first predetermined time period and within a second predetermined time period, the control part is operable, when the first given condition is satisfied, to control the output current such that the output current does not exceed a second upper limit greater than the first upper limit, and the control part is operable, when the second given condition is satisfied, to control the output current such that the output current does not exceed a third upper limit which is greater than the first upper limit and smaller than the second upper limit.

4. A current control method for use with a power supply system comprising a direct-current power source, and a power conditioner connected to the direct-current power source, a utility power source, and a load, the current control method comprising the steps of:

switching from a grid-connected operation in which the power supply system is operated while being connected to the utility power source, to an isolated operation in which the power supply system is operated while being isolated from the utility power source and supplies power to the load; and outputting an alternating-current power from the power conditioner, based on a direct-current power supplied from the direct-current power source, wherein the step of outputting an alternating-current power is:

when a first given condition and a second given condition are not satisfied, controlling an output current of the alternating-current power such that the output current does not exceed a first upper limit preliminarily determined based on a rated output current value of the power conditioner, wherein the first given condition is that an elapsed time after the switching to the isolated operation is within a first predetermined time period and the second given condition is that an elapsed time after the switching is greater than the first predetermined time period and within a second predetermined time period, when the first given condition is satisfied, controlling the output current such that the output current does not exceed a second upper limit greater than the first upper limit, and when the second given condition is satisfied, controlling the output current such that the output current does not exceed a third upper limit which is greater than the first upper limit and smaller than the second upper limit.

* * * * *